United States Patent [19]

Olivenbaum

[11] Patent Number: 4,875,132
[45] Date of Patent: Oct. 17, 1989

[54] ANTENNA GROUNDING SYSTEM
[75] Inventor: James E. Olivenbaum, Houston, Tex.
[73] Assignee: Tideland Signal Corporation, Houston, Tex.
[21] Appl. No.: 266,541
[22] Filed: Nov. 3, 1988
[51] Int. Cl.[4] .............................................. H02H 9/04
[52] U.S. Cl. ........................................ 361/117; 361/1; 361/111; 174/2; 343/872
[58] Field of Search ................. 361/91, 111, 117, 118, 361/119, 136, 212, 216, 217, 218, 1, 56; 174/2; 343/771, 845, 872

[56]  References Cited
U.S. PATENT DOCUMENTS

| 2,712,604 | 7/1955 | Thomas Jr. et al. | 343/771 |
| 2,973,515 | 2/1961 | Adams | 343/845 |
| 3,252,161 | 5/1966 | Gottwald et al. | 343/872 |
| 3,899,787 | 8/1975 | Czerwinski | 343/872 |
| 4,513,338 | 4/1985 | Goodall et al. | 361/118 |
| 4,625,256 | 11/1986 | Scuka et al. | 361/117 |
| 4,631,544 | 12/1986 | Ploussios | 343/771 |

FOREIGN PATENT DOCUMENTS 327873  5/1975  U.S.S.R. .............. 343/872

Primary Examiner—A. D. Pellinen
Assistant Examiner—H. L. Williams
Attorney, Agent, or Firm—Fulbright & Jaworski

[57]  ABSTRACT

A lightning protected antenna in which at least one metallic antenna and its connected electronic housing is enclosed in a pressurized non-magnetic enclosure. A conductive path for lightning is provided which does not interfere with the radiation pattern of the antenna. The path includes a metal tip on top of the enclosure, and the antenna itself is used as a conductive path for the antenna grounding system.

5 Claims, 2 Drawing Sheets

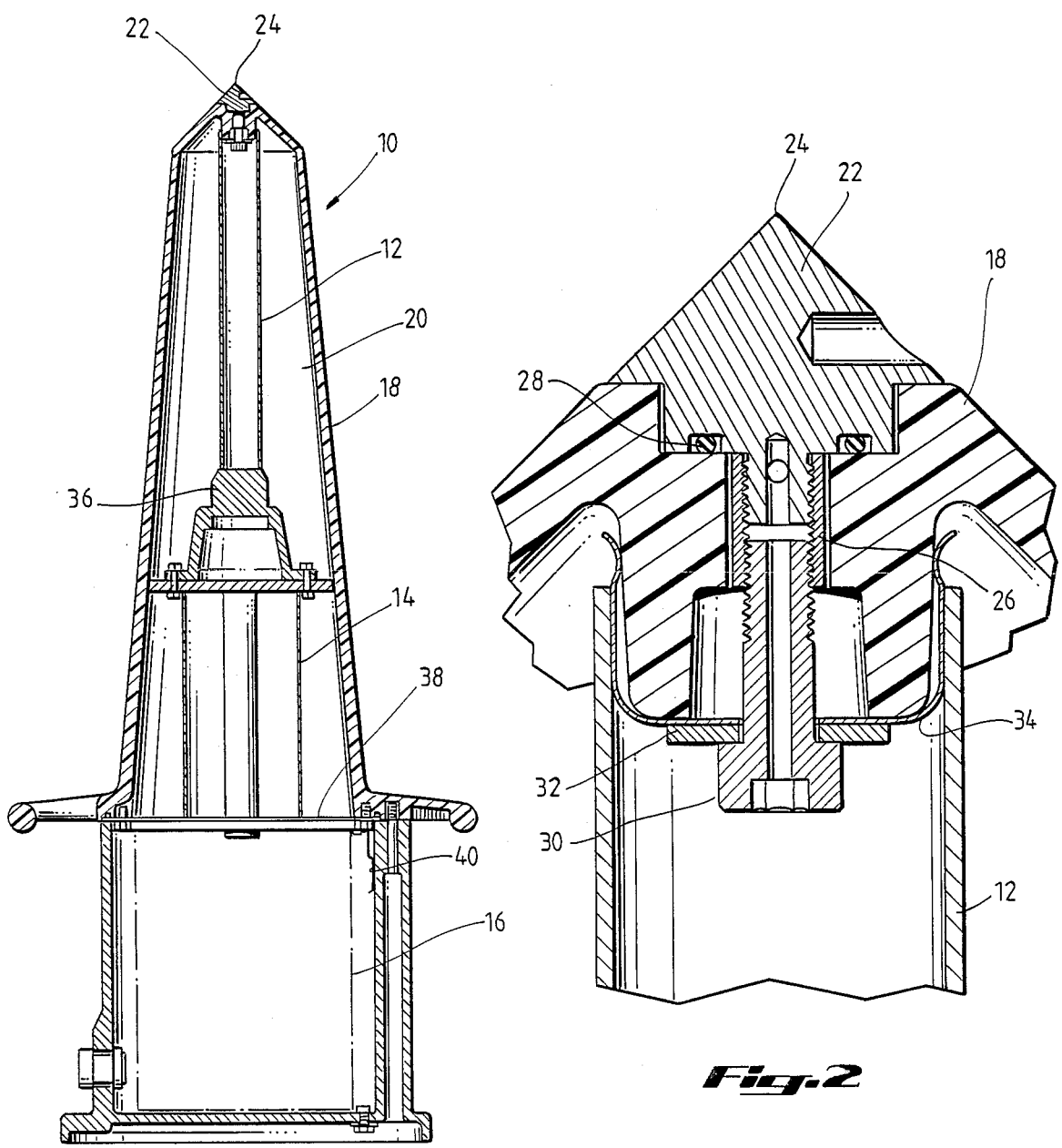

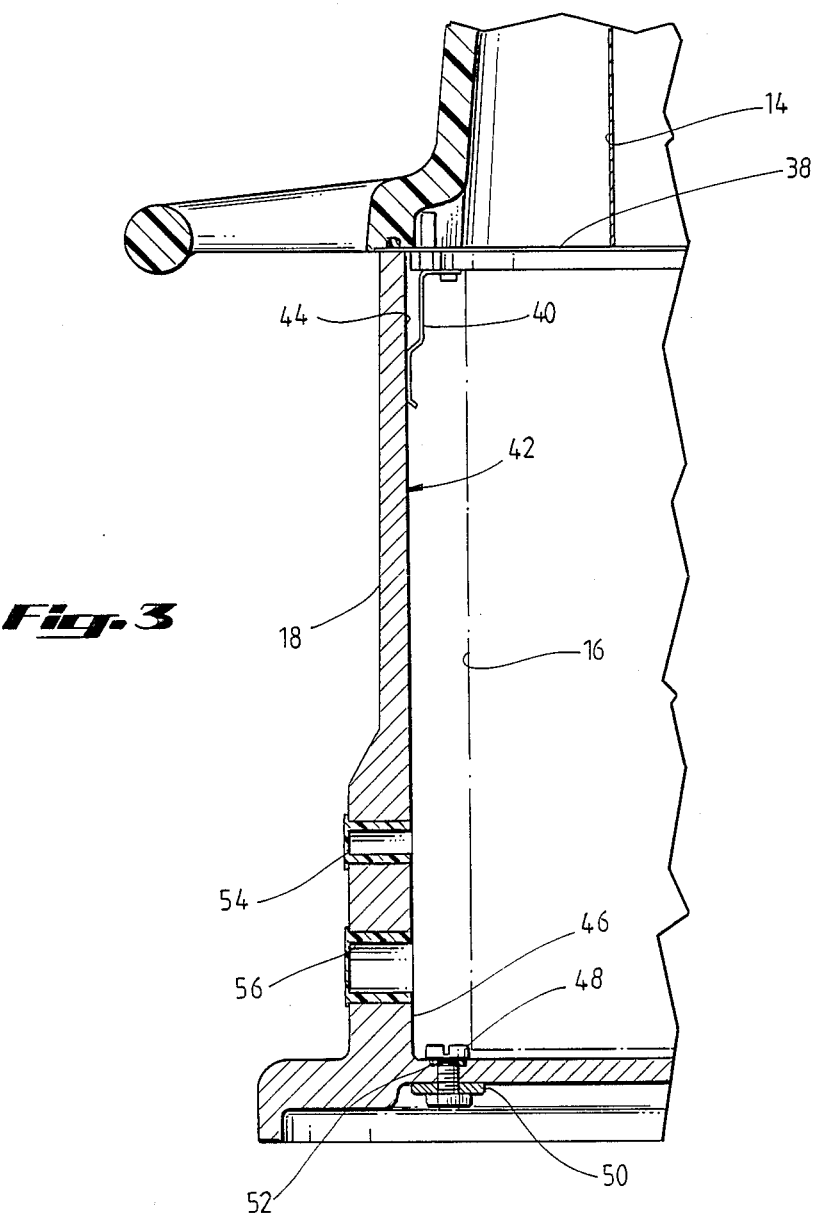

ANTENNA GROUNDING SYSTEM

BACKGROUND OF THE INVENTION

The present invention is directed to an antenna grounding system for protecting the antenna from lightning. In particular, the present invention is directed to a marine radar beacon, or racon, which may include S and X-band antennas which are enclosed in an insulated enclosure or radome which may be pressurized with an inert gas to insure that there are no moisture damage or oxidation to the racon electronic package.

The present system provides a conductive path for lightning to follow into and out of the enclosure for reducing the potential for damage to the antenna system. However, the grounding path must be provided in a location which does not interfere with the radiation pattern of the antennas which are mounted within the radome. Therefore, a conductive path cannot be provided external to the radome without adversely affecting the radiation pattern of the antennas mounted within the radome. The present invention utilizes the antenna or antennas themselves as the conductive path of the antenna grounding system for conducting away the surge of current in a lighting bolt.

The present invention provides a low impedance path from the top of the radome to below the electronics package to earth ground which is compatible with a pressurized electrically insulated enclosure or radome.

SUMMARY

The present invention is directed to a lightning protected antenna which includes at least one metallic antenna, an electronic housing containing electrical power and controls positioned below the antenna and a non-magnetic enclosure surrounding the antenna in housing. A metal tip is provided on top of the enclosure and a first electrically conductive lead is connected between the tip and the antenna. A second electrically conductive lead is connected to the antenna and extends through the enclosure at a position below the antenna for connection to ground.

Still a further object of the present invention is wherein the first and second conductive leads includes spring actuated contacts for allowing ease of assembly of the antenna and grounding system into the enclosure.

Preferably, the first and second conductive leads are in electrical communication with the antenna at the ends of the antenna.

Still a further object of the present invention is wherein the enclosure includes a pressurized gas for impeding the entrance of moisture into the enclosure.

Still a further object of the present invention is wherein the metal tip is pointed on the top for both preventing birds from perching on top of the enclosure and for reducing the potential required for the air around the end of the point to ionize so as to encourage lightning to strike the grounded system rather than some other part of the antenna system.

Yet a further object of the present invention is the provision of a lightning protected racon which includes first and second vertically stacked and connected metallic antennas and an electronic housing containing electrical power and controls for the antennas positioned below the stacked antennas. A non-magnetic enclosure surrounds the antennas and housing and is pressurized with gas. A metal tip is provided on top of the enclosure. A first electrically conductive spring lead is connected to the tip and biased against the upper end of the first antenna. A second electrically conductive spring lead is connected to the bottom of the second antenna. A metal conductor is positioned on the inside of the enclosure and has first and second ends. The first end of the conductor engages the second spring lead and the second end of the conductor extends to the lower end of the enclosure to ground.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is an elevational view, in Cross section, illustrating one embodiment of the present invention, FIG. 2 is an enlarged fragmentary elevational view of the top of the apparatus shown in FIG. 1, and FIG. 3 is an enlarged fragmentary elevational view of the bottom of the grounding system shown in FIG. 1.

BRIEF DESCRIPTION OF THE PREFERRED EMBODIMENT

Referring now to the drawings and particularly to FIG. 1, the reference numeral 10 generally indicates a racon of the present invention which generally includes an S-band antenna 12, an X-band antenna 14, and an electronic housing 16 containing electrical power and controls for the antennas 12 and 14. A non-magnetic, electrically nonconductive enclosure or radome 18 is provided which encloses the antennas 12, 14 and electronic housing 16 and may be of any suitable material such as plastic. Preferably, the interior 20 of the enclosure 18 is pressurized with an inert gas for inhibiting the entrance of moisture into the interior 20 and to the electronic housing 16.

The present invention is directed to providing an antenna grounding system to provide a conductive path for lightning to follow into and out of the pressurized, electrically insulated enclosure 18, for reducing the potential for measured damage to the racon 10. However, the grounding system must not interfere with the radiation Pattern of the antennas 12 and 14 mounted within the radome 18. Normally, lightning will strike the highest point in an assembly and will follow a direct a path as possible to get to ground and will follow the path of minimum impedance. Neither the radome 18 nor the conductive electrical path can be provided externally of the antennas 12 and 18 without adversely affecting the radiation pattern of the antennas 12 and 14. Therefore, the conductive path of the present invention utilizes the antennas 12 and 14 as a part of the conductive path. The path should be a low impedance path provided from the top of the racon 10 to earth ground and preferably route the path away from the electronic housing 16 in order to bypass the electronic circuitry.

Referring now to FIGS. 1 and 2, a metal tip 22 is provided on the top of the radome 18. Preferably, the metal tip has a sharp point 24 on top which serves several purposes First, the pointed metal tip 22 tends to prevent birds from perching on the top and messing up the radome. Secondly, the sharp point 24 is desirable in that it reduces the potential required for air around the point 24 to ionize. This will encourage lightning to strike this very point rather than selecting another portion of the racon 10 which is not protected. The enclosure 18 includes a metallic insert 26. The metal tip 22 screws into the insert 26 and sealably engages the radome 18 by O-ring seals 28. If desired, the metal tip 22 may also serve as a passageway for purging air from the interior of the enclosure 18.

A bolt 30 is screwed into the bottom of the insert 26 and with a washer 32 secures a first electrically conductive contact 34 between the tip 22 and the top portion of the S-band antenna 12. That is, a conductive electrical path starts with the top metal tip 22, the metal insert 26, the bolt 30, the washer 32, and the electrically conductive contact 34 for contact with the antenna 12. Preferably, the electrical contact 34 is a metal spring which is biased outwardly to make contact with the inside of the antenna 12. While other types of connectors may be used, the use of the spring lead 34, provides ease of longitudinal installation of the antenna 12 into the interior of the plastic enclosure 18.

The antennas 12 and 14 are vertically stacked antennas which are connected together through the metal base 36 of the antenna 12. Thus the conductive grounding path extends through the base 36, the X-band antenna 14, and the metal base flange 38 for the antenna 14. While the antennas 12 and 14 may be conventional coaxial antennas, such as disclosed in U.S. Pat. No. 4,631,544, the ground path is created through the exterior portion of the antennas 12 and 14.

Referring now to FIGS. 1 and 3, a second electrically conductive spring lead 40 is provided which is connected to the bottom of the second antenna 14 to the base plate 38. A metal conductor plate 42 is positioned on the inside of the enclosure 18, preferably spaced from the electronic housing 18, and includes first and second ends. The first end 44 makes contact with the spring lead 40 as the interior elements, antenna 12, antenna 14 and electronics package 16, are assembled into the enclosure 18. The second end 46 extends through the lower end of the enclosure 18 to ground. This may be accomplished by being connected to a screw 48 which is connected to a ground strap 50 which then may be connected to one of the mounting bolts for the racon 10. A suitable O-ring 52 is provided to seal the exit of the screw 48 through the enclosure 18. Sealable opening 54 may be provided for insertion of gas if preferred. And a sealable opening 56 is provided for the power and control cables. If desired, the second end 46 of the metal conductor 42 may exit through the sidewall of the radome 18 instead of the bottom. However, it is preferable that the conductive ground bypass the electronic housing 16 in order to reduce the hazards to the electronics. If the housing base is electrically conductive, such as a metal, metal conductor plate 42 is not required.

Thus, an antenna grounding system is provided which provides a low impedance conductive path for the lightning to follow into and out of the pressurized radome 18, all without interfering with the radiation pattern of the antennas.

The presently preferred embodiment of the invention has been given for the purpose of disclosure, and numerous changes in the details of construction and arrangement of parts will be readily apparent to those skilled in the art and which are encompassed within the spirit of the invention and the scope of the appended claims.

What is claimed is:

1. A lightning protected antenna comprising,
   at least one metallic antenna,
   an electronic housing containing electrical power and controls positioned below said antenna,
   a non magnetic, electrically non-conductive enclosure surrounding said antenna and housing,
   a metal tip on the top of the enclosure,
   a first electrically conductive lead connected between the tip and said antenna,
   a second electrically conductive lead connected to the antenna and extending through the enclosure at a position below the antenna for connection to ground, wherein said first and second conductive leads include spring biased contacts, and said first and second conductive leads are in electrical communication with the antenna at the ends of the antenna.

2. The apparatus of claim 1 wherein the first and second conductive leads are in electrical communication with the antenna at the ends of the antenna.

3. The apparatus of claim 1 wherein the enclosure includes a pressurized gas.

4. The apparatus of claim 1 wherein the metal tip is pointed on the top.

5. A lightning protected racon comprising,
   first and second vertically stacked and connected metallic antennas,
   an electronic housing containing electrical power and controls for the antennas positioned below said stacked antennas,
   a non-magnetic enclosure surrounding said antennas and housing, said enclosure being pressurized with a gas,
   a metal tip on the top of the enclosure,
   a first electrically conductive spring lead connected to the tip and biased against the upper end of the first antenna,
   a second electrically conductive spring lead connected to the bottom of the second antenna,
   a metal conductor positioned on the inside of the enclosure and having first and second ends, the first end engaging the second spring lead, and the second end extending through the lower end of the enclosure to ground.

* * * * *